J. WOODWARD.
MACHINE FOR MAKING BRICKS, TILES, &c., FROM SLAG, OR SCORIA.

No. 191,504. Patented May 29, 1877.

Attest:
R. N. Dyer
L. H. Seely

Inventor:
Joseph Woodward,
by Geo. W. Dyer
Atty.

UNITED STATES PATENT OFFICE.

JOSEPH WOODWARD, OF BEDALL, ENGLAND.

IMPROVEMENT IN MACHINES FOR MAKING BRICKS, TILES, &c., FROM SLAG OR SCORIA.

Specification forming part of Letters Patent No. 191,504, dated May 29, 1877; application filed September 1, 1875.

*To all whom it may concern:*

Be it known that I, JOSEPH WOODWARD, of Bedall, in the county of York, England, gentleman, have invented certain new and useful Improvements in Machinery for the Manufacture of Bricks, Tiles, Slabs, &c., of which the following is a specification:

The object I have in view is the production of a machine for manufacturing bricks, tiles, or other articles, from slag or scoria, which will be simple in construction, convenient in use, and capable of making the bricks with great rapidity.

My invention therein consists in the peculiar divided molds, with one part of each mold hinged to the base-plate, and all the base-plates connected together to form an endless chain; secondly, in the truck or trolley having a wrought-iron frame for supporting the rollers over which the molds travel; and, further, in the combination of such truck or trolley with the endless chain of molds.

The molds are made of any suitable metal or material, and are divided into two parts or sides, one of which is secured rigidly to a base-plate, while the other is hinged thereto. The base-plates of these molds are joined together so as to form an endless chain or band of molds, and which endless chain of molds passes and travels over two rollers, which are mounted in a wrought-iron frame upon a truck or trolley for that purpose. The slag or scoria is run direct from the spout of the slag-hole into one of the molds, and when this is full the chain is moved forward, by band or otherwise, until the next mold is brought under the spout to be filled, and so on continuously. As each mold arrives at its farthest position from the spout, and commences turning over the roller, the sides of the mold fall asunder and throw out the molded brick or other article, which by this time is perfectly set and hard. As each mold is returning beneath the center of the roller the sides fall into place again by their own weight, ready to be charged again with fresh scoria.

As the bricks or other articles are delivered, an attendant, provided with tongs or other suitable instrument, arranges them upon a slowly-traveling endless platform, which carries them immediately into the mouth of the annealing kiln or furnace, which is made sufficiently wide and long for the reception of the same.

I will now refer to the accompanying drawings, from which the nature of this invention will be more clearly understood.

Figure 1:
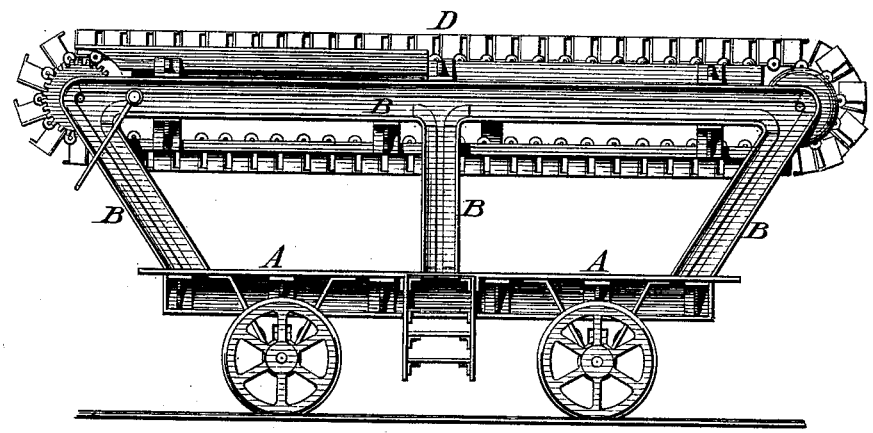
Figure 2:
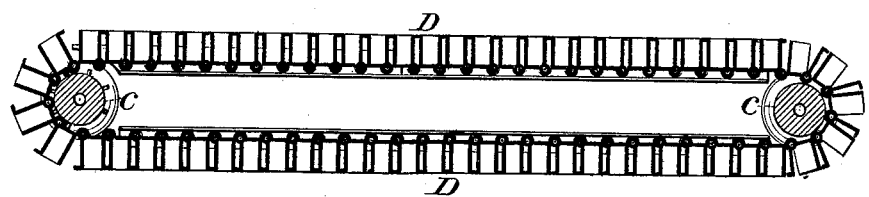
Figure 3:
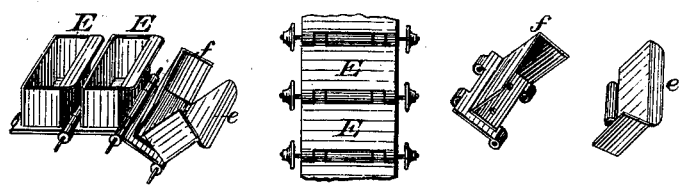
Figure 3:
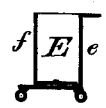

Figure 1 is a side elevation. Fig. 2 is a central longitudinal section of the endless chain of molds and the supporting-rollers; and Fig. 3 views of the molds and parts of the same.

Like letters denote corresponding parts in each figure.

A A is the bottom frame of the truck or trolley, B B the wrought-iron frame supporting the two rollers C C, D D being the chain of molds. E E are the molds, each of which is divided into two parts and provided with the side or part $f$ rigidly attached to the base-plate, and the side or part $e$ hinged to such base-plate.

I claim—

1. In a machine for making bricks, tiles, &c., the combination of the molds E, having the side $f$ rigidly attached to the base-plate and the side $e$ hinged to such base-plate, the base-plate of all the molds being joined together to form an endless chain, substantially as described and shown.

2. The construction of the truck or trolley, with the wrought-iron frame supporting the two rollers, substantially as set forth and described.

3. The combination and arrangement of the endless chain of molds with the truck or trolley, substantially as and for the purposes set forth and described.

JOSEPH WOODWARD.

Witnesses:
E. P. H. VAUGHAN,
    *London.*
R. S. MORDAUNT VAUGHAN,
    *Darlington.*